United States Patent
Poloni et al.

(10) Patent No.: US 9,983,097 B2
(45) Date of Patent: May 29, 2018

(54) METHODS AND APPARATUS FOR ASSESSING TIRE HEALTH THROUGH MONITORING EFFECTIVE TIRE ROLLING RADIUS

(71) Applicants: Ford Global Technologies, LLC, Dearborn, MI (US); THE REGENTS OF THE UNIVERSITY OF MICHIGAN, Ann Arbor, MI (US)

(72) Inventors: Tomas Poloni, Ann Arbor, MI (US); Jianbo Lu, Northville, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 37 days.

(21) Appl. No.: 15/183,450

(22) Filed: Jun. 15, 2016

(65) Prior Publication Data

US 2017/0363515 A1 Dec. 21, 2017

(51) Int. Cl.
| | | |
|---|---|---|
| *G01M 17/00* | (2006.01) |
| *G06F 7/00* | (2006.01) |
| *G06F 19/00* | (2018.01) |
| *G01M 17/02* | (2006.01) |
| *B60C 23/02* | (2006.01) |
| *G07C 5/02* | (2006.01) |
| *G07C 5/08* | (2006.01) |

(52) U.S. Cl.
CPC ............. *G01M 17/02* (2013.01); *B60C 23/02* (2013.01); *G07C 5/02* (2013.01); *G07C 5/08* (2013.01)

(58) Field of Classification Search
CPC ..... G01M 17/02; G01M 17/005; B60C 23/02; B60C 23/061; G07C 5/02; G07C 5/08; B60W 40/064
See application file for complete search history.

(56) References Cited

U.S. PATENT DOCUMENTS

| 5,847,645 | A * | 12/1998 | Boesch ................. B60C 23/061 340/442 |
| 6,269,690 | B1 | 8/2001 | Shimizu et al. |
| 7,483,794 | B2 | 1/2009 | Bocquillon et al. |
| 2004/0172181 | A1 * | 9/2004 | Lu ......................... B60C 23/061 701/36 |
| 2004/0225423 | A1 | 11/2004 | Carlson et al. |
| 2005/0030170 | A1 * | 2/2005 | Rieck .................... B60C 23/061 340/443 |
| 2006/0267750 | A1 * | 11/2006 | Lu ......................... B60C 23/061 340/440 |

(Continued)

FOREIGN PATENT DOCUMENTS

EP 2982521 2/2016

*Primary Examiner* — Rachid Bendidi
(74) *Attorney, Agent, or Firm* — Frank MacKenzie; Hanley, Flight & Zimmerman, LLC (57) ABSTRACT

Methods and apparatus for assessing tire health through monitoring an effective tire rolling radius are disclosed. An example method includes obtaining velocity data for a vehicle from a global positioning system, obtaining angular speed data for a wheel of the vehicle, processing the velocity data and the angular speed data using a digital filter, and determining an effective rolling radius of a tire coupled to the wheel based on the processed velocity data and angular speed data.

11 Claims, 6 Drawing Sheets

(56) References Cited

U.S. PATENT DOCUMENTS

| | | | |
|---|---|---|---|
| 2008/0119978 A1* | 5/2008 | Stieff | G01B 11/2755 |
| | | | 701/31.4 |
| 2008/0272899 A1* | 11/2008 | Penzotti | B60T 8/17554 |
| | | | 340/444 |
| 2010/0060443 A1* | 3/2010 | Wakao | B60C 11/246 |
| | | | 340/444 |
| 2010/0186492 A1* | 7/2010 | Morinaga | B60C 11/24 |
| | | | 73/146 |
| 2012/0179327 A1* | 7/2012 | Yngve | B60W 40/064 |
| | | | 701/32.9 |
| 2016/0033367 A1* | 2/2016 | Unterreiner | G01L 17/005 |
| | | | 73/8 |

* cited by examiner

METHODS AND APPARATUS FOR ASSESSING TIRE HEALTH THROUGH MONITORING EFFECTIVE TIRE ROLLING RADIUS

FIELD OF THE DISCLOSURE

This disclosure relates generally to assessing tire health and, more particularly, to methods and apparatus for assessing tire health through monitoring effective tire rolling radius.

BACKGROUND

Vehicle tires are in contact with a road surface and directly transfer forces that act on a vehicle.ABnormal tire forces transferred to the vehicle could lead to an uncomfortable driving experience and degraded fuel economy. Abnormal tire forces due to, for example, excessive tire wear, low tire pressure, poor tire alignment, etc. can also affect driving performance. Thus, it is desirable to know the condition of vehicle tires with respect to driving performance and driving comfort. Monitoring the health of the tires of a vehicle can facilitate maintenance and/or replacement of tires that may affect driving performance or driving comfort.

SUMMARY

An example method includes obtaining velocity data for a vehicle from a global positioning system, obtaining angular speed data for a wheel of the vehicle, processing the velocity data and the angular speed data using a digital filter, and determining an effective rolling radius of a tire coupled to the wheel based on the processed velocity data and angular speed data.

An example apparatus includes a global positioning system module, a wheel speed sensor, and a processor to obtain velocity data for a vehicle from the global positioning system module, obtain angular speed data for a wheel of the vehicle from the wheel speed sensor, process the velocity data and the angular speed data using a linear estimation filter, and determine an effective rolling radius based on the processed velocity data and angular speed data.

Another example method includes determining an effective rolling radius of a tire, estimating a pressure of the tire based on the effective rolling radius, and identifying a low pressure of the tire by comparing the pressure to a threshold.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The effective rolling radius of a tire of a vehicle can be used for tire diagnostics. As set forth in the examples described below, the effective rolling radius of a tire may be determined using velocity data for a vehicle from a global positioning system and angular speed data for a wheel of the vehicle. The velocity data, the angular speed data, and/or the determined effective rolling radius data are processed using a digital filter prior to being used to determine the effective rolling radius. The digital filter used to process velocity data and angular speed data may implement a linear estimation algorithm such as, for example, a Kalman filter, a batch least squares filter, a recursive least squares filter, etc. To increase the accuracy of the results, the velocity data and the angular speed data are synchronized by time-shifting the angular speed data based on a latency of the global positioning system data. After the effective rolling radius of a tire is determined, a condition of the tire (e.g., tire wear, tire pressure, etc.) may be determined based on the effective rolling radius. The condition may be displayed to a driver of a vehicle via a driver interface or display. Alternatively or additionally, the condition of the tire may be displayed to an operator or technician via a workstation (e.g., during service of the vehicle, via a connected car information system).

The effective rolling radius of the tire can be used to estimate an unloaded radius of the tire, which can then be used to estimate wear of the tire. A worn tire may be identified by comparing the unloaded tire radius to a threshold. The unloaded radius is determined based on a pressure of the tire, a load of the tire, and a type of the tire, which may be input by an operator when the tire is changed, and/or may be measured using one or more sensors integrated with the vehicle. If the tire is identified as worn, an alert may be communicated to the driver via the driver interface or display of the vehicle. An amount of remaining useful life can also be determined based on the unloaded radius by monitoring the unloaded radius over a period of time and determining a rate at which the unloaded radius changes. The determined remaining useful life may be communicated to the driver via the display. In addition to the remaining useful life, a tread depth of the tire may also be determined based on the unloaded radius.

The pressure of the tire can be estimated based on the effective rolling radius of the tire. A tire can be identified as having a low pressure by comparing the pressure of the tire to a threshold pressure. In addition to the velocity and angular speed data used to determine the effective rolling radius, a tire load and tire wear condition may also be used to determine the tire pressure. To accurately determine the pressure, a correction factor for the tire load and the tire wear (e.g., a tire wear correction, a tire load correction) may compensate for changes in the effective rolling radius due to wear and load. A rate of change of tire pressure can be determined by, for example, monitoring the tire pressure over a period of time and can be used for tire diagnostics. For example, a high rate of change of tire pressure may indicate that there is a leak or hole in the tire. If the tire pressure is low or the rate of change of tire pressure is high, an alert may be presented to the driver via the vehicle display. The tire pressure determined based on the effective rolling radius may also be compared to a tire pressure measured by a pressure sensor to perform diagnostics or to evaluate the operation of the pressure sensor.

Figure 1:
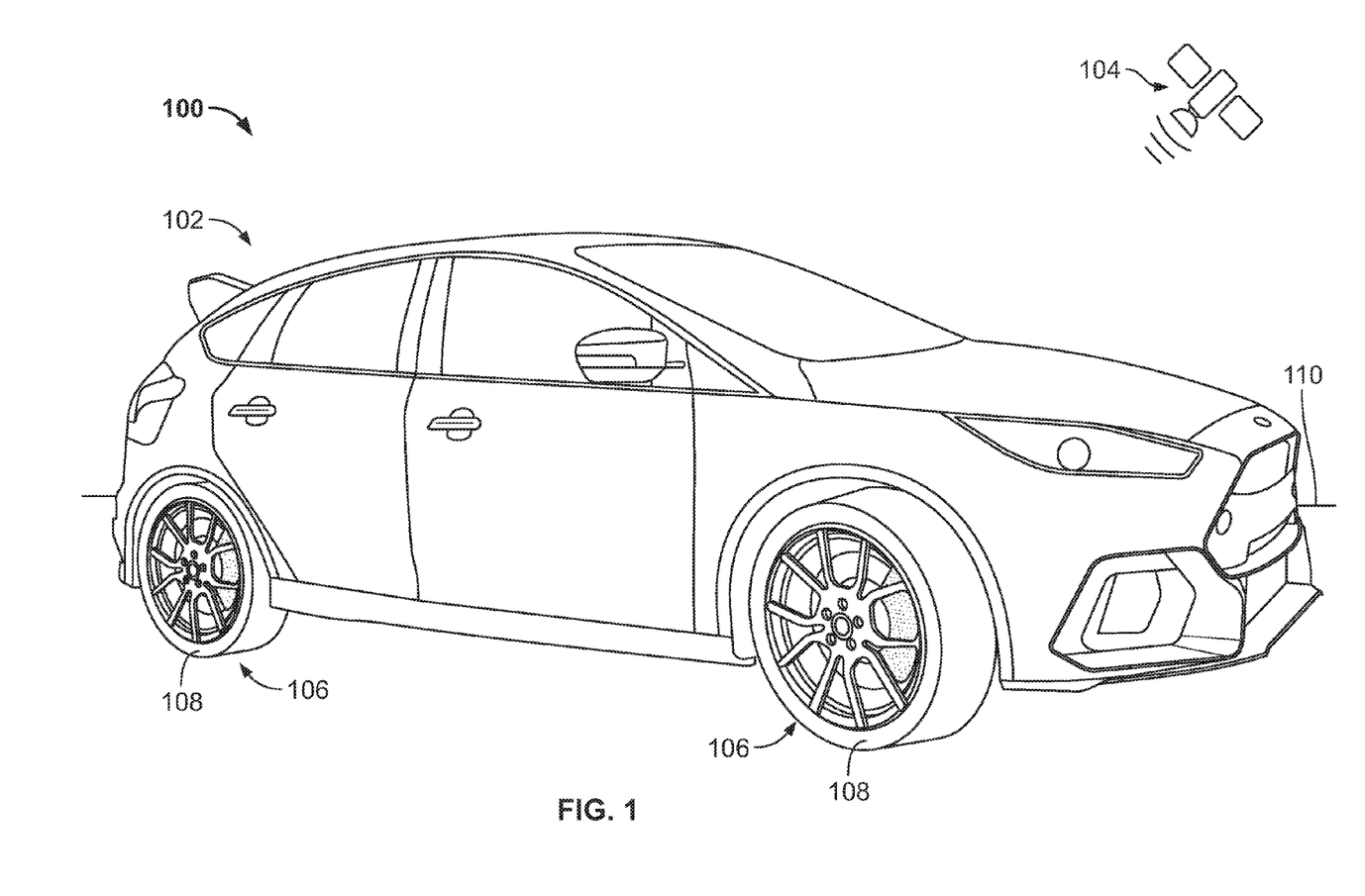
FIG. 1 represents an example environment in which the apparatus and methods disclosed herein may be implemented.

FIG. 1 represents an example environment 100 in which the apparatus and methods disclosed herein may be implemented. The example environment 100 includes an example vehicle 102 that uses one or more sensors to monitor vehicle systems (e.g., brake systems, tires, etc.). The example vehicle 102 may be a connected vehicle (e.g., a vehicle equipped with Ford SYNC) operative to share information via wireless communication (e.g., wireless internet, short-range communication channels, cellular signals). In some examples, the information related to vehicle systems may be shared with a device associated with a driver (e.g., a smart phone, wearable, tablet, etc.) and/or a workstation used by an operator or technician while servicing the vehicle 102.

The example vehicle 102 may be in communication with a system of satellites 104 (e.g., a global positioning system (GPS)). Specifically, the vehicle 102 may be equipped with an integrated navigation system that can communicate with one or more GPS satellites 104 to obtain information, including position and velocity of the vehicle 102. The information obtained via the integrated navigation system can then be used by other systems and/or a processor (e.g., the processor 202 of FIG. 2) of the vehicle 102.

The processor may also be in communication with one or more other sensors of the vehicle 102. For example, the vehicle 102 includes a plurality of wheels 106 to which tires 108 are coupled. The wheels 106 and/or tires 108 may include various sensors (e.g., angular speed sensors, loading or force sensors, pressure sensors, etc.) that may be used to determine a condition of one or more of the tires 108. Determining the condition of the tires 108 can facilitate proper maintenance of the tires 108 and/or the vehicle 102. Because the tires 108 are in contact with a road surface 110, forces are transferred between the tires 108 and the vehicle 102. The forces from the tires 108 and/or the road 110 can affect the handling, driving experience, and fuel economy of the vehicle 102. Abnormal forces may be the result of tire wear, abnormal tire pressure, non-uniform tire loading (e.g., one spare tire, single tire loading), etc. and can adversely affect overall performance of the vehicle 102. As used herein, the term "tire" may be used to refer to any of the tires 108 of the vehicle 102.

Figure 2:
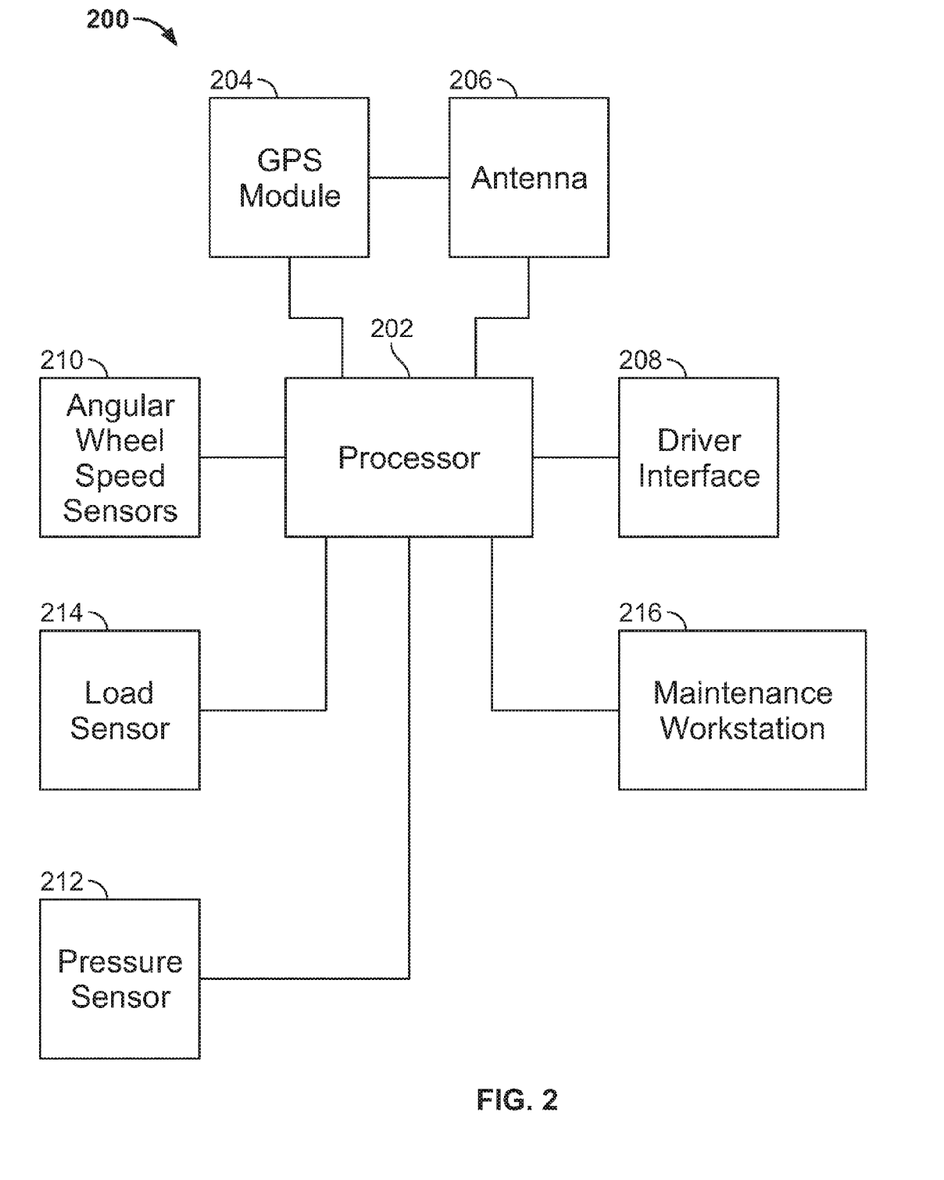
FIG. 2 is a diagram of an apparatus that may be used to implement the example methods described herein.

FIG. 2 is a diagram of an apparatus 200 that may be used in conjunction with the example vehicle 102 of FIG. 1 to implement the example methods described herein. The apparatus 200 includes a processor 202, which may be disposed within the vehicle 102 and operative to communicate with and/or control one or more systems of the vehicle 102. For example, the processor 202 is in communication with the one or more GPS satellites 104 via a GPS module 204 associated with the vehicle 102. The GPS module 204 may be an integrated navigation system or any other GPS module 204 operative to communicate with the processor 202. In some examples, the GPS module 204 uses an antenna 206 to communicate with the GPS satellite(s) 104. The GPS module 204 is operative to communicate with the processor 202 via any suitable form of wired or wireless communication. In the examples described herein, the processor 202 obtains velocity data from the GPS module 204 and/or the GPS satellite(s) 104.

Additionally, the GPS module 204 may be in communication with a driver interface 208 (e.g., a vehicle display, speakers, etc.) via the processor 202. The driver interface 208 may include a display and/or speakers. The GPS module 204 can communicate with a driver of the vehicle 102 via the driver interface 208 using audible, visual, or audio-visual notifications. The driver interface 208 is also operative to display diagnostic messages related to a condition or health of the tire 108 (e.g., wear, pressure, estimated remaining life, etc.). In some examples, the driver interface 208 may also indicate the conditions of the tire 108 via an auditory warning (e.g., a sound, a verbal warning).

The example processor 202 is also communicatively coupled to angular wheel speed sensors (WSS) 210 to obtain angular wheel speed data therefrom. An angular wheel speed sensor 210 is operatively coupled to each of the wheels 106 to measure the angular speed of each wheel 106. The angular wheel speed sensors 210 may be coupled to respective axles on which the wheels 106 are rotatably coupled. Alternatively, the angular wheel speed sensor(s) 210 are coupled to a different part of the wheel 106 or wheel assembly to obtain the angular wheel speed of each wheel 106. The angular wheel speed sensor(s) 210 may be used for many applications or functions of the vehicle 102 including an anti-lock braking system (ABS), a traction control system (TCS), electronic stability control (ESC), and roll stability control (RSC). The angular wheel speed sensors 210 are operative to communicate with the processor 202 via any suitable form of wired or wireless communication.

The processor 202 uses the obtained velocity data and angular wheel speed data to calculate an effective rolling radius (ERR) of each tire 108 of the vehicle 102. However, the velocity data is inherently delayed due to the latency in communication between the GPS satellite(s) 104 and the GPS module 204. To synchronize the velocity data and the angular wheel speed data, a time-delay is introduced by the processor 202 to time-shift the angular wheel speed data to compensate for the latency of the GPS signals from the one or more GPS satellites 104. The time-delay introduced to the angular wheel speed data may be an n-order delay (e.g., $k^{-n}$, where k is a constant based on the system). Synchronizing the velocity data and angular wheel speed data may increase the accuracy of the ERR calculated based on the data.

The ERR is an important health characteristic of the tire 108 and can be used to determine other aspects and/or conditions of the tire 108 under known operational conditions. For example, the ERR can be used for diagnostic and prognostic purposes, including determining wear and pressure of the tire 108 and estimating a remaining useful life of the tire 108. The ERR may vary based on driving conditions (e.g., driving straight, turning). Thus, an assumption is made that the tire 108 and/or the wheel 106 is operating under rolling, no slip or low slip driving conditions.

The ERR is a function of characteristics of the tire 108 including wear, pressure, static and dynamic loading of the vehicle 102, and type of tire 108. To accurately determine the ERR and/or other operational properties derived from the ERR, the particular driving conditions on which the ERR depends may be isolated. A tire 108 under a free rolling condition has at least three different radius lengths: an unloaded radius, a loaded radius, and the effective rolling radius. Because the radius may vary with the load, knowing the load on the tire 108 facilitates accurate calculation of the ERR of the tire 108.

For applications where velocity data obtained via the GPS module 204 and the satellites 104 and angular wheel speed data obtained via the angular wheel speed sensors 210 are available, the ERR can be determined using Equation 1, where $v_r$ is the linear velocity of the vehicle 102 (e.g., the velocity of the vehicle 102 determined by the GPS module 204) and $\omega$ is the angular wheel speed. After the velocity data and angular wheel speed data are synchronized (i.e., compensated for latency of the signals from the satellites 104), the ERR is determined using Equation 1.

$$r = \frac{v_r}{\omega} \qquad \text{Equation 1}$$

It is assumed when using Equation 1 that the wheel 106 and tire 108 are operating under free rolling conditions and are not exposed to any longitudinal slip or slide conditions. Under straight, constant driving conditions, the rolling speed (e.g., linear speed) of the tire 108 is equivalent to the velocity obtained by the GPS module 204.

The processor 202 may also use a digital filter using an online estimation technique to determine the ERR in real-time using Equation 1. The online estimation technique enables the processor 202 to continuously determine the ERR while the vehicle 102 is in motion. Alternatively, the ERR of the tire 108 may be determined offline and calculated for batches of data (e.g., a plurality of data points for velocity and angular wheel speed) and updated periodically as additional data is obtained. The digital filter may also reduce noise or extraneous data points in the velocity data, the angular speed data, and/or the calculated ERR data. The ERR data may include an ERR calculated for each data point of the velocity data and the angular wheel speed data and may be filtered after the ERR is determined. The digital filter may implement a linear estimation algorithm such as, for example, a Kalman filter, a batch least squares filter, a recursive least squares filter, etc., to filter the velocity data and angular wheel speed data. The linear estimation algorithm is operative to filter extraneous data points while determining the ERR of the tire 108. For example, the velocity data and the angular wheel sped data may be processed using a Kalman filter, which filters the data and also calculates the ERR using Equation 1. Alternatively, a separate filter may be implemented prior to determining the ERR of the tire 108 to filter extraneous data points from the velocity and angular wheel speed data. Alternatively, the ERR is calculated using unfiltered velocity data and angular wheel speed data and the digital filter is applied as the resulting ERR data.

The conditions of the tire 108 can be determined based on the calculated ERR. Using the online estimation technique to determine the ERR enables the condition of the tire 108 to be monitored in substantially real-time. For example, as additional velocity and angular speed data is collected over time, the ERR is re-calculated using the additional data and, thus, the conditions determined using the ERR can be updated, allowing the conditions to be monitored in real time. Conditions of the tire 108 that can be determined using the ERR include the amount of wear of the tire 108, the pressure of the tire 108, abnormal and/or single tire 108 loading (e.g., due to a spare tire being used). For example, if the ERR of a single tire 108 is significantly less than the ERR of the other tires 108, the processor 202 may determine that the one tire 108 is experiencing abnormal loading, which may indicate that the single tire 108 is a spare tire or a flat tire.

The ERR can be used to determine an unloaded radius of the tire 108. The unloaded radius can be used to determine how worn the tire 108 may be and/or an estimated remaining life of the tire 108. Because the ERR changes based on driving conditions (e.g., pressure, load, etc.), the processor 202 determines the unloaded radius using the determined ERR and known factors, such as pressure of the tire 108, loading force on the tire 108, maneuvering, and a type of the tire 108. The pressure of the tire 108 is determined using a tire pressure sensor (TPS) 212, which may be operatively coupled to each tire 108 and in communication with the processor 202. An average static loading of the tire 108 is determined using a load sensor (LS) 214, which may be operatively coupled to each tire 108 and/or to the vehicle 102 and is in communication with the processor 202. The maneuvering factor is based on an assumption that the tire 108 is under free rolling conditions with no slip or low slip holds.

Equation 2 is used to determine the unloaded radius, where $r_o$ is the unloaded radius, r is the effective rolling radius (ERR), D is a parameter based on the load (e.g., weight of the vehicle) and varies if the load varies, B is a parameter based on the downward force on the tire 108 along the tire characteristic curve, E is a parameter based on tire stiffness and varies with the pressure of the tire 108, ρ is tire 108 deflection (determined using pressure, load, and type of tire 108), and $\rho_o$ is the tire deflection for a nominal load on the tire 108. The parameters D, B, and E may be derived from a table or chart based on one or more of the factors listed above and/or the ERR.

$$r_o = r + \rho_0\left[D\arctan\left(B\frac{\rho}{\rho_0}\right) + E\frac{\rho}{\rho_0}\right] \qquad \text{Equation 2}$$

After the unloaded radius is determined, the wear of the tire 108 can be estimated. The unloaded radius is compared to a threshold, which is a pre-set threshold based on information (e.g., the type, brand, size, etc.) related to the tire 108. In some examples, the unloaded radius of the tire 108 is compared to a minimum radius (e.g., a minimum unloaded radius at which the tires are considered acceptable). For example, if an unloaded radius of a tire 108 is below the minimum radius threshold, that tire 108 is designated as worn and is to be replaced. Alternatively, the amount of wear the tire 108 has experienced since the tire 108 was installed on the vehicle 102 can be determined. In such examples, the threshold to which the unloaded radius is compared is the original radius of the tire 108, which may be determined using information provided by a manufacturer of the tire 108. A tire 108 with a greater difference between the determined unloaded radius and the original radius has experienced more wear.

A tread depth of the tire 108 can also be estimated based on the determined unloaded radius of the tire 108. The unloaded radius of the tire 108 can be compared to the preset threshold value, which is the new radius minus the expected worn tread depth (e.g., 6 millimeters, which is the tread depth at which the tire 108 is considered worn). If the unloaded tire 108 radius is greater than the threshold, the processor 202 continues to monitor the radius of the tire 108 and the rate of radius change is recorded.

The unloaded radius of the tire 108 may be monitored over time to determine prognostics of the health of the tire 108. As the unloaded radius of the tire 108 changes over time due to wear, a rate of change of the unloaded radius is determined. The rate of change is then used to determine a remaining percentage of useful life of the tire 108 and/or a used percentage of useful life of the tire 108. The average life of the tire 108 can be graphically represented as a line extending between the original radius of the tire 108 and the minimal radius of the tire 108 over time. The determined rate of change of the unloaded radius can affect the length of time for the tire 108 to reach the minimum radius. After the unloaded radius and the rate of change of the unloaded radius have been determined, the remaining amount of useful life of the tire 108 can be determined. In some examples, a chart and/or table is created based on the rate of change of the unloaded radius, the original radius, and the minimum radius to determine the remaining useful life of the tire 108 at multiple potential unloaded radii.

The determined ERR can also be used to determine a pressure of the tire 108. The ERR indicates the pressure change in a tire 108 because a less pressurized tire 108 may have a smaller ERR than a more pressurized tire 108. Tire pressure is a function of loading of the tire 108, wear of the tire 108, maneuvering, and type of tire 108. The example method to indirectly measure the pressure of the tire 108 estimates the pressure of the tire 108 based on the estimated rolling radius and known pressure of the tire 108 (e.g., a previously measured or determined pressure of the tire 108). The pressure of the tire 108 can be calculated using Equation 3, where $p_t$ is the pressure, k is a load-dependent constant, r is the ERR of the tire 108 determined using the methods and apparatus described herein, and c is a tire wear characteristic parameter (e.g., c may change based on an amount of estimated wear of the tire 108).

$$P_t = kr + c \qquad \text{Equation 3:}$$

The average static loading of the tire 108 is determined using the load sensor 214. The maneuvering of a vehicle 102 is assumed to be a free rolling condition with no slip or low slip of the tire 108. In some examples, the wear of the tire 108 is assumed to be nominal (e.g., for a new tire 108). However, the constant wear of the tire 108 decreases the accuracy of the pressure estimates for the tire 108. The expected error in estimated pressure of the tire 108 is approximately two pounds per square inch (psi) for a worn tire 108. The mileage information of the vehicle 102 may be used to account for this error in estimated pressure. The pressure of the tire 108 is estimated using the ERR and a pressure of the tire 108 determined based on the static tire pressure model.

Based on the estimated pressure of the tire 108, a recommendation or alert can be communicated to a driver of the vehicle 102. For example, if the pressure of the tire 108 is low, an alert can be communicated to the driver indicating the low pressure and/or a recommendation to add more air to the tire 108. In some examples, to determine whether the pressure of the tire 108 is low, the pressure is compared to a preset threshold value (e.g., the minimum safe pressure for the tire 108). If the determined pressure is lower than the threshold pressure, a recommendation to pressurize the tire 108 (e.g., add air to the tire 108) is made to the driver 102. If the determined pressure of the tire 108 is not lower than the threshold pressure, the apparatus may continue monitoring the pressure of the tire 108. Additionally, a change in pressure of the tire 108 may be monitored and/or recorded. Based on the change in pressure, diagnostics can determine if one or more tires 108 has a hole, a leak, or another defect causing loss of air in the tire 108.

The processor 202 may also be operatively coupled to a maintenance workstation 216. In some examples, the vehicle 102 and thus, the processor 202, are coupled to the maintenance workstation 216 when the vehicle 102 is brought in for service. Alternatively, the vehicle 102 may be in communication with the maintenance workstation 216 using a wireless connection. In some such examples, the vehicle 102 is a connected vehicle 102, thus all vehicle data, including the determined ERR data, is available to a technician (e.g., an operator, a mechanic, an engineer) via the maintenance work station 216. The vehicle data may be used for diagnostics, or other purposes, such as general vehicle performance monitoring and data gathering. For example, the technician may use the vehicle data to determine how long a tire 108 lasts under certain conditions to make more accurate predictions about life of the tire 108 in the future.

While an example manner of implementing the example apparatus 200 of FIG. 2 is illustrated, one or more of the elements, processes and/or devices illustrated in FIG. 2 may be combined, divided, re-arranged, omitted, eliminated and/or implemented in any other way. Further, the example processor 202, the example GPS module 204, the example angular wheel speed sensor 210, the example pressure sensor 212, the example load sensor 214, the example driver interface, 208 and/or, more generally, the example apparatus 200 of FIG. 2 may be implemented by hardware, software, firmware and/or any combination of hardware, software and/or firmware. Thus, for example, any of the example processor 202, the example GPS module 204, the example angular wheel speed sensor 210, the example pressure sensor 212, the example load sensor 214, the example driver interface, 208 and/or, more generally, the example apparatus 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 202, the example GPS module 204, the example angular wheel speed sensor 210, the example pressure sensor 212, the example load sensor 214, the example driver interface, 208 and/or, more generally, the example apparatus 200 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 may include one or more elements, processes and/or devices in addition to, or instead of, those illustrated in FIG. 2, and/or may include more than one of any or all of the illustrated elements, processes and devices.

Figure 3:
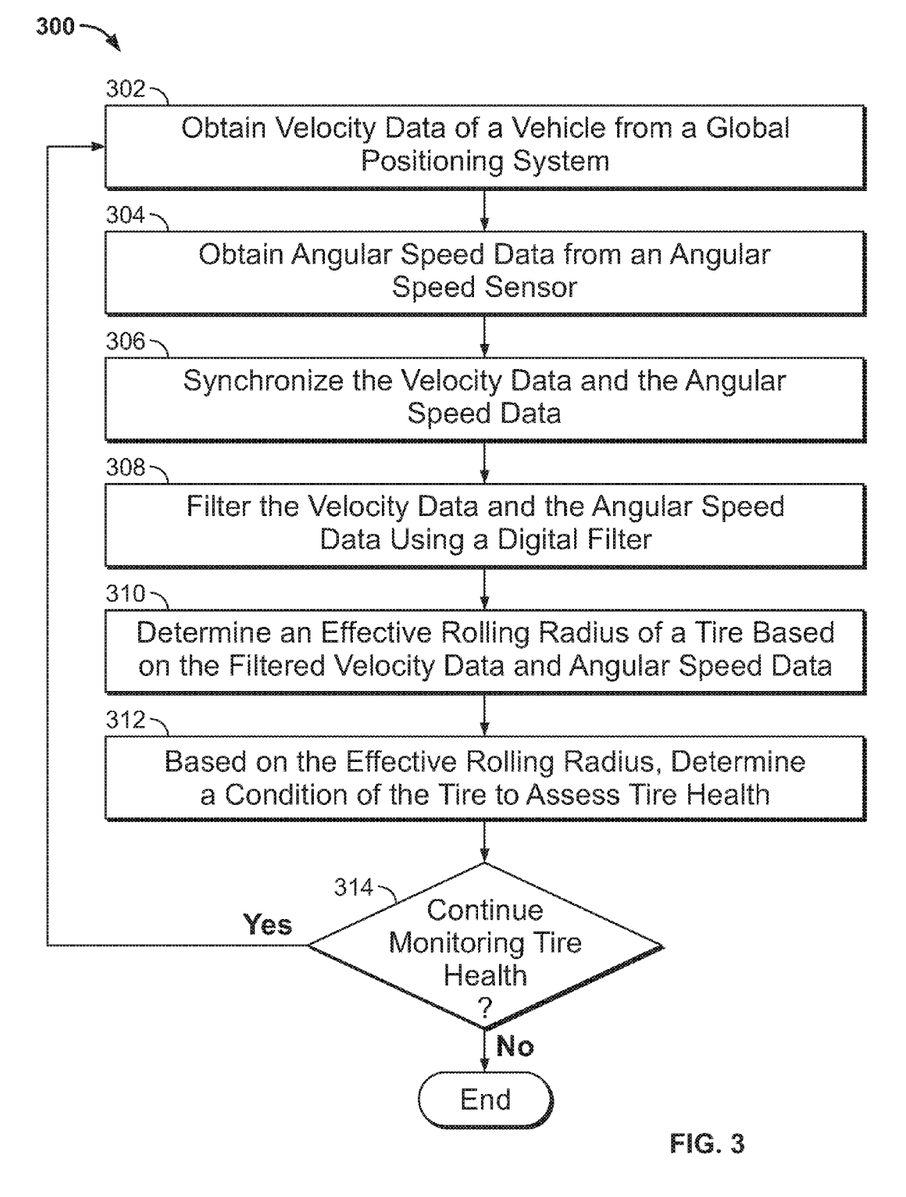
FIGS. 3-5 are example flowcharts representative of the example methods implemented by the apparatus described herein.
Figure 4:
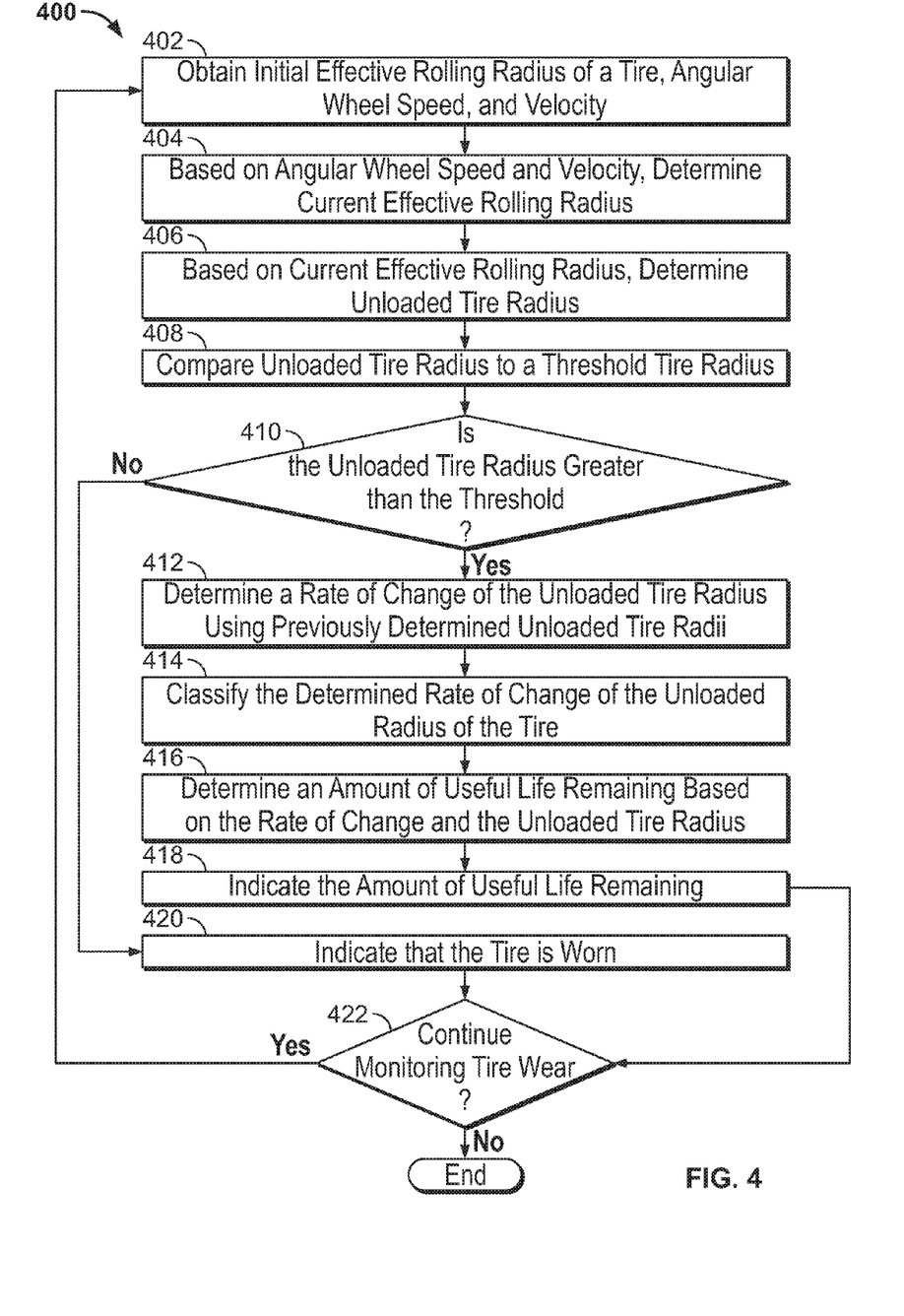
Figure 5:
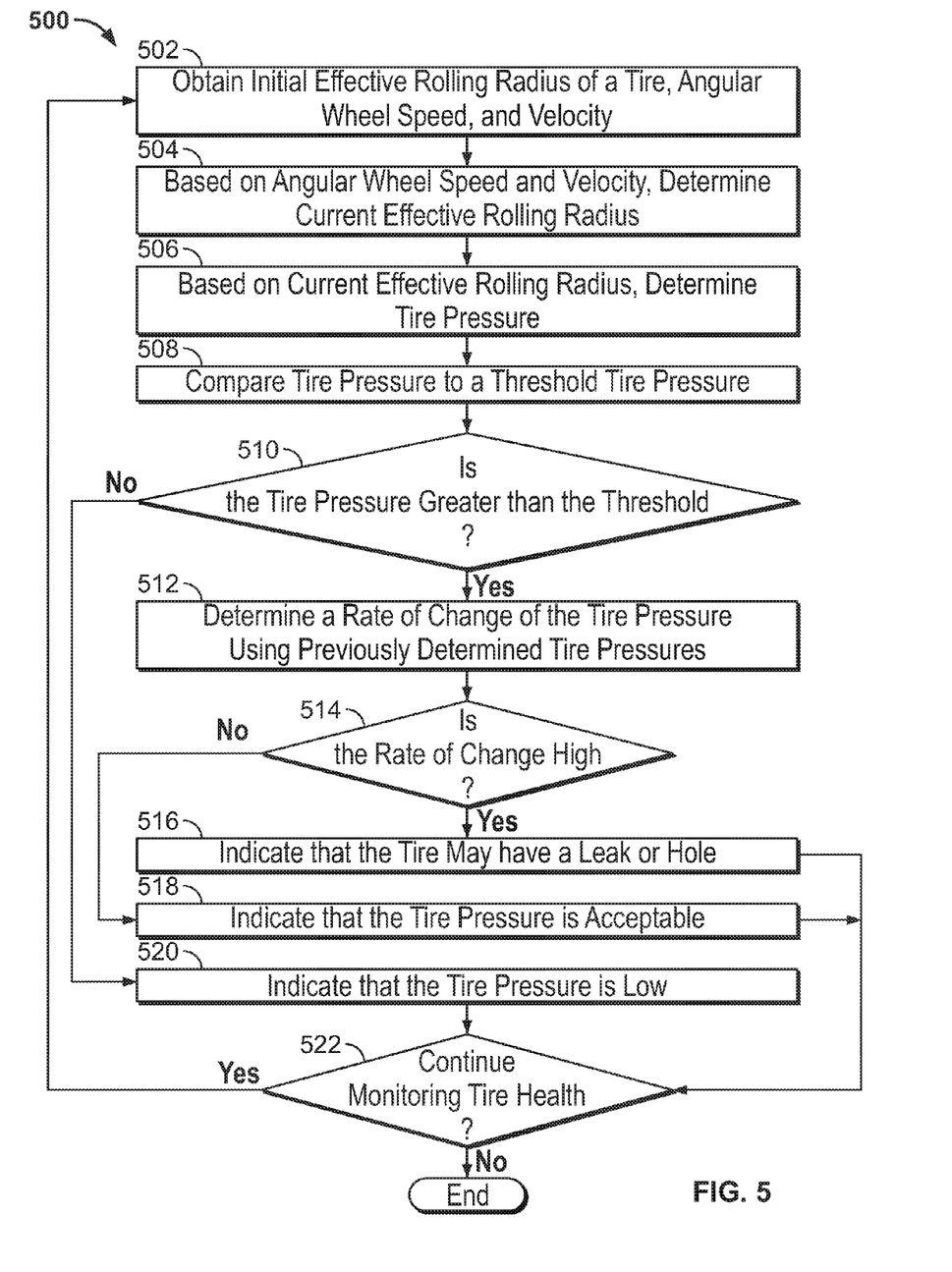

Example flowcharts representative of example methods for implementing the apparatus 200 of FIG. 2 are shown in FIGS. 3-5. The example methods may be implemented using machine readable instructions that comprise a program for execution by a processor, such as the processor 202 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowcharts illustrated in FIGS. 3-5, many other methods of implementing the example apparatus 200 may alternatively be used. For example, the order of execution of the blocks may be changed, and/or some of the blocks described may be changed, eliminated, or combined.

As mentioned above, the example methods of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 3 is a flowchart representative of an example method 300 implemented by the apparatus 200 described herein. The example method 300 begins by obtaining velocity data of the vehicle 102 from a global positioning system (block 302). The velocity data may be obtained via the GPS module 204 of the vehicle 102 and one or more GPS satellites 104. The method 300 also includes obtaining angular speed data from the angular speed sensor 210 of the vehicle 102 (block 304). The angular speed data and the velocity data may be obtained simultaneously or in any order. After the velocity data and the angular speed data are obtained, the data is synchronized to compensate for latency of the GPS signal (block 306). The data may be synchronized by applying an n-order delay to the angular wheel speed data. In some examples, the velocity data and the angular speed data are filtered using a digital filter (block 308). Alternatively, the velocity data and angular speed data may be filtered prior to synchronization. The digital filter used may implement a linear estimation filter such as, for example, a Kalman filter, a recursive least squares filter, a batch least squares filter, etc.

After the velocity data and angular speed data are synchronized and filtered, an ERR of a tire 108 of the vehicle 102 is determined using the filtered velocity data and angular speed data (block 310). Based on the determined ERR, a condition of the tire 108 may be determined to assess the health of the tire 108 (block 312). The example flowcharts depicted in FIGS. 4 and 5 represent example methods 400, 500 of determining one or more conditions of the tire 108 based on the determined ERR of the tire 108. The processor 202 determines whether or not to continue monitoring tire health (block 314). This determination may be based on a user input or on a result of the ERR of the tire 108 and/or a determined condition. If the processor 202 determines to continue monitoring the health of the tire 108, the processor 202 returns to block 302 to obtain new data. If the processor 202 determines to end health monitoring of the tire 108, the method 300 ends.

FIG. 4 represents an example method 400 of determining whether the tire 108 is worn based on the determined effective rolling radius. The method 400 begins by obtaining an initial effective rolling radius, angular wheel speed data, and velocity data (block 402). The initial ERR of the tire 108 may be the ERR determined using the method 300 of FIG. 3 and/or the ERR most recently determined, which may be stored in a storage device (e.g., mass storage 628 of FIG. 6) associated with the processor 202. Based on the angular wheel speed and velocity data, the method 400 determines a current ERR (e.g., update the ERR of the tire 108 based on the angular wheel speed and velocity data obtained in block 402) (block 404). Based on the current or updated effective rolling radius, the method 400 determines an unloaded radius of the tire 108 (block 406). The unloaded radius of the tire 108 may be determined using, for example, Equation 2. The method 400 then compares the unloaded radius to a threshold radius of the tire 108 (block 408). The threshold radius of the tire 108 may correspond to a minimum radius for an acceptable tire 108 or may be any other pre-set threshold determined by the technician.

If the unloaded radius of the tire 108 is less than the threshold (block 410), the status of the tire 108 (e.g., "worn tire") is indicated to the driver via the driver interface 208 of the vehicle (block 420). If the unloaded radius of the tire 108 is greater than or equal to the threshold (block 410), a rate of change of the unloaded radius of the tire 108 may be determined (block 412). In some examples, the rate of change of the unloaded radius of the tire 108 may also be determined for tires 108 having an unloaded radius less than the threshold. The rate of change of the unloaded radius of the tire 108 is determined using previous data collected corresponding to the unloaded radius (e.g., the unloaded radii of the tire 108 determined over a time period). The rate of change of the unloaded radius of the tire 108 may be classified as a high rate of change or a low rate or change (block 414). For example, if the rate of change is high, the tire 108 may have a hole or other defect causing air leakage. Alternatively, if the rate of change is low or non-existent, the tire 108 is not likely to be leaking air. The amount of leakage may affect the life of the tire 108 and/or may be communicated to the driver via the driver interface 208 of the vehicle 102.

The amount of useful life can also be determined based on the unloaded radius and/or the rate of change of the unloaded radius of the tire 108 (block 416). The amount of remaining useful life of the tire 108 may be communicated to the driver via the driver interface 208 of the vehicle 102 and/or communicated to the technician via the maintenance workstation 216 (block 418). The processor 202 then determines whether to continue monitoring the tire 108 for wear (block 422). If the monitoring is to continue, the processor 202 returns to block 402 to obtain updated data. If the monitoring does not continue, the method 400 ends.

FIG. 5 represents an example method 500 of determining a pressure of the tire 108 based on the determined effective rolling radius. The method 500 begins by obtaining an initial effective rolling radius, angular wheel speed data, and velocity data (block 502). The initial effective rolling radius may be the effective rolling radius determined using the method 300 of FIG. 3 and/or the effective rolling radius most recently determined, which may be stored in a storage device (e.g., the mass storage 628 of FIG. 6) associated with the processor 202. Based on the angular wheel speed and velocity data, a current effective rolling radius of the tire 108 is determined (e.g., update the effective rolling radius based on the angular wheel speed and velocity data obtained in block 502) (block 504). Based on the current or updated effective rolling radius, determine a pressure of the tire 108 (block 506). The determined pressure of the tire 108 is compared to a threshold pressure of the tire 108 (block 508). The threshold pressure of the tire 108 may be a nominal pressure set by the technician that represents an ideal or expected pressure of the tire 108. In some examples, the determined pressure of the tire 108 may be compared to a measured pressure of the tire 108 to perform diagnostics on a sensor (e.g., pressure sensor 212).

If the pressure of the tire 108 is less than a threshold (block 510), a low pressure alert is communicated to the driver via the driver interface 208 of the vehicle 102 and/or to an operator via the maintenance workstation 216 (block 520). If the pressure of the tire 108 is greater than or equal to the threshold pressure (block 510), a rate of change of the pressure of the tire 108 may be determined (block 512). The rate of change of the pressure is determined using previous data collected corresponding to the pressure of the tire 108 (e.g., the pressure of the tire 108 determined over a time period). The rate of change of the pressure of the tire 108 may be used to determine if the tire 108 is leaking. For example, if the rate of change is high (block 514), the tire 108 may have a hole or other defect causing leakage of air. If the tire 108 is leaking air, the driver interface 208 may communicate to the driver that the tire may have a leak or hole (block 516). Alternatively, if the rate of change is low or non-existent (block 514), the tire 108 is not likely to be leaking air. An indication that the pressure of the tire 108 is acceptable may be presented to the user via the driver interface 208 (block 518).

The processor 202 then determines whether to continue monitoring the pressure of the tire 108 (block 522). If the monitoring is to continue, the processor 202 returns to block 502 to obtain updated data. If the monitoring does not continue, the method 500 ends.

Figure 6:
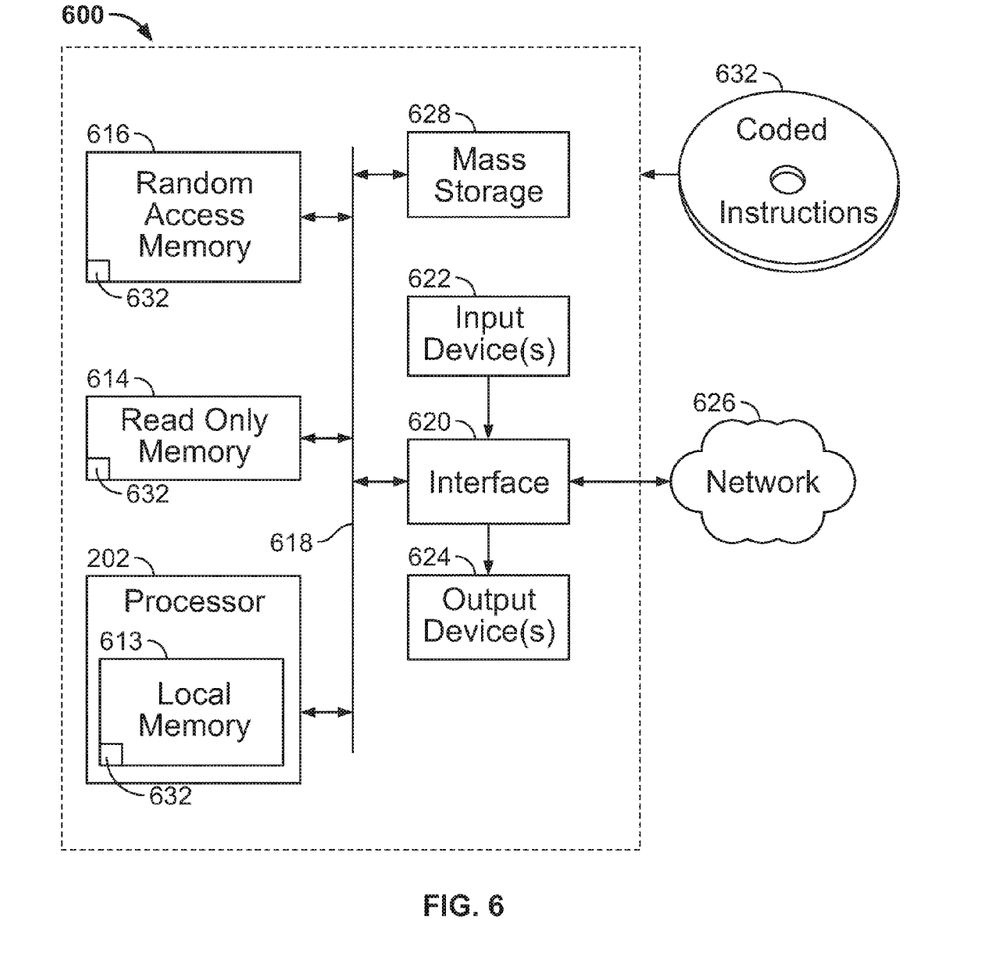
FIG. 6 is an example processor platform that may be used with the example apparatus of FIG. 2 and/or the example methods of FIGS. 3-5.

FIG. 6 is a block diagram of an example processor platform 600 capable of executing instructions to implement the methods of FIGS. 3-5 and the apparatus of FIG. 2. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes the processor 202. The processor 202 of the illustrated example is hardware. For example, the processor 202 can be implemented by one or more integrated circuits, logic circuits, microprocessors or controllers from any desired family or manufacturer.

The processor 202 of the illustrated example includes a local memory 613 (e.g., a cache). The processor 202 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 (e.g., the driver interface 208, the angular wheel speed sensor 210, the load sensor 214, the pressure sensor 212, etc.) are connected to the interface circuit 620. The input device(s) 622 permit(s) a user to enter data and commands into the processor 202. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 (e.g., the driver interface 2308, the maintenance workstation 216) are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 3-5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture enable a processor of a vehicle to effectively monitor the health of the tire on the vehicle using the effective rolling radius of the tire, which is calculated using velocity data from a GPS system and angular wheel speed data from a sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   obtaining velocity data for a vehicle from a global positioning system;
   obtaining angular speed data for a wheel of the vehicle from a wheel speed sensor;
   processing the velocity data and the angular speed data using a digital filter;
   determining an effective rolling radius of a tire coupled to the wheel based on the processed velocity data and angular speed data;
   determining an unloaded radius of the tire based on the effective rolling radius;
   synchronizing the velocity data and the angular speed data prior to determining the effective rolling radius of the tire, wherein synchronizing the velocity data and the angular speed data includes time shifting the angular speed data based on a latency of global positioning system data;

determining a condition of the tire based on the effective rolling radius; and indicating the condition of the tire to a driver via a display of the vehicle.

2. The method of claim 1, wherein the digital filter uses a linear estimation algorithm.

3. The method of claim 2, wherein the linear estimation algorithm implements at least one of a Kalman filter, a batch least squares filter, and a recursive least squares filter.

4. The method of claim 1, wherein determining the condition of the tire includes determining an amount of wear of the tire.

5. The method of claim 1, wherein determining the condition of the tire includes determining a pressure of the tire.

6. The method of claim 1, wherein the unloaded radius of the tire is further based on a measured pressure of the tire.

7. The method of claim 1 further including determining a tire deflection, wherein the tire deflection is based on a pressure, a load, and a type of the tire.

8. The method of claim 1 further including determining a tread depth of the tire based on the unloaded radius.

9. The method of claim 1 further including determining a remaining useful life of the tire based on the unloaded radius.

10. An apparatus comprising:
a global positioning system module;
a wheel speed sensor;
a processor to:
   obtain velocity data for a vehicle from the global positioning system module;
   obtain angular speed data for a wheel of the vehicle from the wheel speed sensor;
   process the velocity data and the angular speed data using a linear estimation filter;
   determine an effective rolling radius based on the processed velocity data and angular speed data;
   determine an unloaded radius of a tire of the wheel based on the effective rolling radius;
   synchronize the velocity data and the angular speed data prior to determining the effective rolling radius of the tire by time shifting the angular speed data based on a latency of global positioning system data; and
   determine a condition of a tire based on the effective rolling radius; and a display, wherein the condition of the tire is indicated to a driver via the display.

11. The apparatus of claim 10, wherein the processor is to further determine an amount of wear experienced by the tire.

* * * * *